United States Patent [19]
Baxter et al.

[11] Patent Number: 5,756,844
[45] Date of Patent: May 26, 1998

[54] CONCENTRATED AMINOANTHRAQUINONE BLUE COLORANTS

[75] Inventors: D. Roderick Baxter; P. John Cranmer, both of Mirfield, England

[73] Assignee: Morton International Limited, Hounslow, United Kingdom

[21] Appl. No.: 911,889

[22] Filed: Aug. 15, 1997

[51] Int. Cl.$^6$ .............................................. C07C 211/00
[52] U.S. Cl. ............................................. 564/321
[58] Field of Search ................................... 564/321

[56] References Cited

U.S. PATENT DOCUMENTS 4,602,913  7/1986  Grollier et al. ............................ 8/405
4,746,461  5/1988  Zielske ..................................... 260/370

FOREIGN PATENT DOCUMENTS 2209984  3/1973  Germany.

*Primary Examiner*—Raymond Henley, III
*Attorney, Agent, or Firm*—Wayne E. Nacker; Gerald K. White

[57] ABSTRACT

To produce a concentrated solution of aminoanthraquinone dyes in aromatic solvent, quinizarin or a leuco derivative thereof is reacted with a mixture of at least three aliphatic amines in a solvent which is a glycol or a glycol ether. The glycol or glycol ether solvent is present in an amount of 50 wt % or less relative to the quinizarin or leuco derivative plus amines. After the reaction, water and excess amine are stripped and aromatic solvent is added to adjust the dye concentration to the desired concentration above 40 wt % dye.

12 Claims, No Drawings

CONCENTRATED AMINOANTHRAQUINONE BLUE COLORANTS

BACKGROUND OF THE INVENTION

1. Field of the Invention

This invention relates to a process for producing aminoanthraquinone dyes by reacting a hydroxyanthraquinone with a mixture of aliphatic amines and obtaining a concentrated solution of the aminoanthraquinone dyes in an aromatic carrier solvent.

The aminoanthraquinone to which the invention relates have the general formula I:

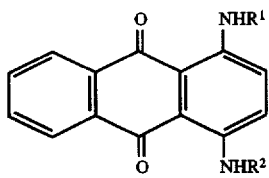

wherein $R^1$ and $R^2$, may be the same or different and each represents a $C_1$-$C_{18}$ alkyl group which may be substituted, for example with one or more alkoxy groups. Such compounds have particular utility as colorants for petroleum products. A typical colorant comprises a mixture of compounds of the general formula.

2. Description of the Prior Art

Compounds of general formula (I) can be made by reacting quinizarin with one or more primary amines. The overall reaction is as follows:

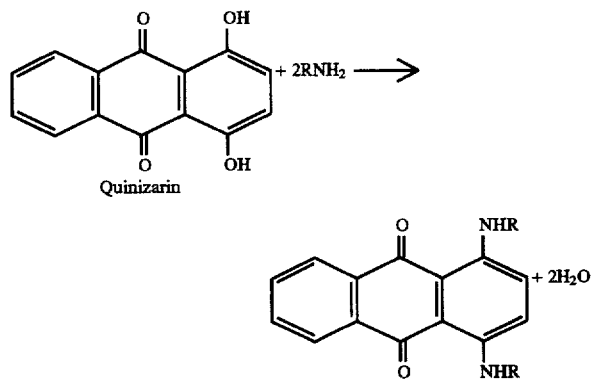

wherein R represents any of the same groups as $R^1$ and $R^2$ above. A mixed product can be produced by using a mixture of amines, and particular physical properties can be produced by selecting the proportions of different amines used. Thus, if amines $R^1NH_2$ and $R^2NH_2$ are used, the relative proportions of each can be selected to give the desired mixture of 1,4-di($R^1$-amino)-, 1,4-di($R^2$-amino)- and 1-$R^1$-amino, 4-$R^2$-aminoanthraquinones for a particular application.

Reactions of this type have hitherto been carried out in an aromatic carrier solvent such as xylene, using a large excess of the amines. This has the advantage that the organic solvent does not have to be separated since the final product is normally sold in solution in an aromatic solvent. However, there are also considerable disadvantages. The reaction proceeds slowly and the water generated generally has to be removed as the reaction proceeds, for example by azeotropic distillation, in order to drive the reaction to completion. During this time side reactions produce undesirable residues which remain in the product.

German patent application 2,209,984 describes a method for reacting quinizarin with amines using glycol as the reaction solvent. A relatively large volume of glycol is employed in this patent, i.e., an amount of solvent by weight at least about equal in weight to the quinizarin plus amine reactants. The dye produced is then precipitated and filtered to recover a solid dye cake.

For many applications, it is desired to have a concentrated, e.g., over 40 wt % solution, of dye in a non-polar, aromatic solvent; for example, for introduction as a dye or a marker into petroleum fuels. Dyes, such as the aminoanthraquinone blues which are the subject of the invention, are notoriously difficult to dissolve into solvents; thus, the method described in German application 2,208,984 does not lead to a practical method of preparing concentrated solutions of these dyes in non-polar solvent. Even if the dye prepared in the German application were not precipitated, it would be impractical to prepare a 40 wt % or above concentrated dye solution in aromatic carrier solvent because of the large volume of reactant solvent. While solvent could be stripped, to remove glycol, the energy cost required to do so would be prohibitive.

SUMMARY OF THE INVENTION

The present invention consists in a process for producing an aminoanthraquinone dye concentrate wherein quinizarin and/or its leucoderivative is reacted with a mixture of three or more aliphatic amines, wherein the reaction is carried out in the presence of a glycol and/or a glycol ether.

The glycol and/or glycol ether preferably replaces all of the aromatic solvent used in the prior art process. A smaller quantity of glycol/glycol ether can be used than the quantity of solvent used previously, and the excess of amine can be smaller. The prior art process using aromatic solvents generally required 3 to 4 moles of amine per mole of quinizarin/leuco quinizarin, representing a 1 to 2 molar excess. The process of the present invention generally requires only 2.05 to 2.50 moles of amine per mole of quinizarin, preferably 2.10 to 2.20 moles. Herein, it is found that the amount of glycol and/or glycol ether used as reactant solvent may be about 50 wt % or less relative to the quinizarin plus amine reactants, preferably about 25 wt % or less, and most preferably about 23 wt % or less.

A further advantage of the process of the invention is that water does not have to be removed from the system during the reaction. The glycol or glycol ether is miscible both with the water and with the dye, and acts a phase transfer agent to give a more homogeneous system.

Subsequent to the reaction, excess amine and water are removed, leaving a highly concentrated solution of dyes in the glycol or glycol ether. This solution can be directly diluted with a non-polar aromatic solvent to provide a solution which is greater than 40 wt % dye, typically 40 to 60 wt % dye, and which is directly miscible into non-polar media, such as petroleum fuel.

In order that a 40 wt % solubility of dyes in non-polar aromatic solvent may be obtained, it is preferred that the reaction mixture contain at least three aliphatic amines and optionally more aliphatic amines. Based on the total amount of aliphatic amines used in the reaction mixture being calculated at 100 wt %, it is preferred that a first aliphatic amine be present at at least about 10 wt %, a second aliphatic amine be present at at least about 10 wt %, and a third aliphatic amine be present at at least about 1 wt %.

DETAILED DESCRIPTION OF THE PREFERRED EMBODIMENTS

Any suitable liquid glycol and/or glycol ether can be used. A preferred compound is dipropylene glycol monomethyl ether, which has low toxicity compare to, for example, ethylene glycol.

Any desired aliphatic amine mixture may be used, depending on the desired property of the product. Of particular interest for the purposes of the invention are the amines disclosed in U.S. Pat. No. 3,597,254, which are reacted in various combinations with quinizarin and/or leucoquinizarin to give blue dyes comprising mixtures of 3 or more 1,4-diaminoanthraquinones. These amines may be substituted and include n-butylamine, isoamylamine, 2-ethyl-n-hexylamine, n-octylamine, decylamine, 2-hexylamine, n-dodecylamine, 2-methoxyethylamine, 3-methoxypropylamine, 3-ethoxypropylamine, 3-butoxypropylamine and 3-(2ethylhexoxy)-propylamine. Other amines which may be used include lower alkyl amines such as methylamine and other isomers of amylamine such as n-amylamine.

The reaction preferably takes place at elevated temperature, suitably 70° to 120° C. and typically at about 100° C.

At the end of the reaction, after removal of any unwanted components such as water, excess amines and/or glycol or glycol ether, the dye is dissolved in a carrier solvent to the desired concentration. A typical final product comprises a 40% solution of the dye in an aromatic solvent such as xylene or a naphthenic solvent, selected for its high flash point and low toxicity. To prevent the dye from precipitating if glycol or glycol ether is removed, the higher boiling aromatic solvent is added even as the lower boiling glycol or glycol ether is removed. Typically; however, some glycol or glycol ether remains with the diluting, aromatic solvent, e.g., at up to 10 wt % of the solution. However, as the glycol or glycol ether is miscible with the aromatic solvent at these concentrations, the glycol or glycol ether generally does not interfere in any way with the end use of the dye concentrate, such as its introduction as a dye or marker into petroleum fuel.

The invention will be further illustrated by the following examples, in which all reactants are at 100%.

EXAMPLE 1

A mixture of 144.0 g quinizarin, 16.0 g leuco-quinizarin, 66 g dipropylene glycol mono methyl ether (DPM), 55.8 g 2-ethyl hexylamine, 38.4 g 3-methoxypropylamine, 31.4 g amylamine and 6.7 g methylamine were gradually heated, with stirring, to 100° C. for a further 2 hours. The product was cooled to 85° C. and air passed through for 3 hours. The excess amines and water of reaction were removed by vacuum distillation and 216 g of a high flash aromatic solvent added to produce a 48 wt % solution of the dye. The product was screened to move any insoluble material.

EXAMPLE 2

A mixture of 50.0 g leuco-quinizarin, 60.0 g DPM, 76.2 g 2-ethylhexylamine, 42.5 g amylamine, 26.0 g 3-methoxypropylamine and 4.4 g methylamine was stirred at below 25° C. 117.7 g quinizarin were added over 1 hour 40 minutes while maintaining the temperature below 25° C. The mixture was then heated to 100° C. over 1 hour 40 minutes and maintained at this temperature until the reaction was complete. The product was cooled to 85° C. and air passed through for 3 hours. The excess amines and water of reaction were removed by vacuum distillation and 226 g of a high flash aromatic solvent added to adjust the strength to a 50 wt % solution. The product was screened to remove any insoluble material.

EXAMPLE 3

A mixture of 96.1 g quinizarin, 24.2 g leuco-quinizarin, 50 g DPM, 85.9 g 2-ethylhexylamine, 24.7 g amylamine and 4.2 g methylamine was heated to 100° C. over 2 hours and maintained at 100° C. until the reaction was complete. The reaction mass was cooled to 95° C. and air passed through for 1 hour. The excess amines and water of reaction were removed by vacuum distillation and 214 g of xylene were added to adjust the strength to a 44 wt % solution. The product was screened to remove any insoluble material.

EXAMPLE 4

To a stirred mixture of 98 g diethylene glycol mon-methyl ether, 44.7 g amylamine, 172.1 g 2-ethylhexylamine and 6.4 g methylamine were added 48.4 g leuco-quinizarin and 192.2 g quinizarin. The mixture was heated to reflux at 98° C. over 1 hour and held at this temperature until the reaction was complete. 400 g of xylene was added to adjust the concentration to 44 wt % and air passed through for 2 hours until the oxidation was complete.

Since other changes and modifications are varied to fit particular operating requirements and environments will be apparent to those skilled in the art, the invention is not considered limited to the examples chosen for the purposes of illustration, and includes all changes and modifications which do not constitute a departure from the true spirit and scope of this invention as claimed in the following claims and equivalents thereto.

What is claimed is:

1. A process for producing a solution of an aminoanthraquinone dye in aromatic solvent at a concentration of at least about 40 wt % dye, the dye having the general formula I:

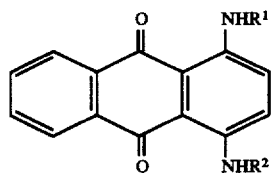

wherein $R^1$ and $R^2$, may be the same or different and each represents a $C_1$–$C_{18}$ alkyl group which may be substituted, said process comprising reacting a starting compound selected from quinizarin, the leucoderivative of quinizarin and mixtures thereof with a mixture of at least three aliphatic amines, wherein the reaction is carried out in the presence of a solvent selected from glycol and glycol ethers in an amount of about 50 wt % or less relative to the combined weight of said starting compound plus said amines, and adding aromatic solvent to a desired dye concentration.

2. The process as claimed in claim 1 wherein the reaction is carried out in the presence of a solvent selected from glycol and glycol ethers in an amount of about 25 wt % or less relative to the combined weight of said starting compound plus said amine.

3. The process as claimed in claim 1 wherein the reaction is carried out in the presence of a solvent selected from glycol and glycol ethers in an amount of about 23 wt % or less relative to the combined weight of said starting compound plus said amine.

4. A process as claimed in claim 1 wherein at least one of said groups $R^1$ and $R^2$ is an alkyoxy substituted alkyl group.

5. A process as claimed in claim 1 wherein said reaction is carried out in the absence of any aromatic solvent.

6. A process as claimed in claim 1 wherein 2.05–2.50 moles of amines are reacted with each mole of quinizarin and/or leuco derivative.

7. A process as claimed in claim 5 wherein 2.10–2.20 moles of amine are reacted with each mole of quinizarin and/or leucoquinizarin.

8. A process as claimed in claim 1 wherein said solvent comprises dipropylene glycol monomethyl ether.

9. A process as claimed in claim 1 wherein said amines are selected from methyamine, n-butylamine, amylamine, 2-ethyl-n-hexylamine, n-octylamine, decylamine, n-hexylamine, n-dodecylamine, 2-methoxyethylamine, 3-methoxypropylamine, 3-ethoxypropylamine, 3-butoxypropylamine and 3-(2'ethylhexoxy)-propylamine.

10. A process as claimed in claim 1 where in the reaction takes place at a temperature from about 70° to about 120° C.

11. A process as claimed in claim 1 wherein said carrier solvent is selected from xylene and naphthenic solvents and mixtures thereof.

12. The process as claimed in claim 1 wherein said aliphatic amine mixture comprises at least about 10 wt % of a first aliphatic amine, at least about 10 wt % of a second aliphatic amine, and at least about 1 wt % of a third aliphatic amine, based on 100 wt % of total aliphatic amines in said mixture.

* * * * *